(12) United States Patent
Rich et al.

(10) Patent No.: US 7,387,304 B1
(45) Date of Patent: Jun. 17, 2008

(54) TANK CARRIER APPARATUS

(76) Inventors: Kelly Rich, 5937 Westheimer Dr.., Brentwood, TN (US) 37027; Kim Frederiksen, 5451 Buffalo Springs, Amarillo, TX (US) 79119; Kristy Gomez, 7820 Farrell, Amarillo, TX (US) 79121; Carla Keiber, 112 N. Avondale, Amarillo, TX (US) 79106

( * ) Notice: Subject to any disclaimer, the term of this patent is extended or adjusted under 35 U.S.C. 154(b) by 292 days.

(21) Appl. No.: 11/182,245

(22) Filed: Jul. 15, 2005

(51) Int. Cl.
*B62B 1/00* (2006.01)

(52) U.S. Cl. ............... 280/47.131; 280/47.26; 280/655

(58) Field of Classification Search ............ 280/47.29, 280/47.17, 47.24, 37, 38, 79.5, 79.6, 47.26, 280/47.131, 47.12, 47.34
See application file for complete search history.

(56) References Cited

U.S. PATENT DOCUMENTS

| 2,667,397 A | | 1/1954 | Hallisey ............... 312/250 |
| 2,831,607 A | * | 4/1958 | Berndt ............... 222/3 |
| 4,253,716 A | | 3/1981 | Turner, Jr. ............ 312/100 |
| 4,739,913 A | | 4/1988 | Moore ............... 224/215 |
| 5,307,839 A | * | 5/1994 | Loebker et al. ............ 137/899 |
| 5,400,934 A | | 3/1995 | Ducros ............... 224/148 |
| 5,433,230 A | * | 7/1995 | Miller ............... 134/110 |
| 5,447,216 A | | 9/1995 | Freyvogel ............... 190/18 |
| 5,447,261 A | | 9/1995 | Mitomi et al. ............ 224/153 |
| 5,492,346 A | | 2/1996 | Stadler et al. ............ 280/47.2 |
| 5,511,682 A | * | 4/1996 | Pace ............... 280/47.26 |
| 5,570,895 A | * | 11/1996 | McCue et al. ............ 280/47.19 |
| 5,690,217 A | * | 11/1997 | Friday ............... 206/278 |
| 6,530,507 B2 | | 3/2003 | Oh ............... 224/153 |
| 6,592,012 B2 | | 7/2003 | Godshaw et al. ............ 224/153 |
| 6,932,364 B2 | * | 8/2005 | Koronowski et al. ....... 280/47.26 |
| 2004/0051264 A1 | | 3/2004 | Koronowski et al. ....... 280/47.26 |
| 2004/0195791 A1 | | 10/2004 | Brookes-Inglis ......... 280/47.26 |
| 2006/0237611 A1 | * | 10/2006 | Sturt et al. ............ 248/311.2 |

* cited by examiner

*Primary Examiner*—Paul N. Dickson
*Assistant Examiner*—Bridget Avery
(74) *Attorney, Agent, or Firm*—Waddey & Patterson, P.C.; Emily A. Shouse

(57) ABSTRACT

An apparatus for transporting an oxygen tank having a main compartment containing a sleeve, the sleeve designed to secure either one or two tanks in place. The apparatus has wheels to facilitate movement of the tank or tanks from place to place and a number of pockets for storage of items. The apparatus further includes a port for a hose to be connected to the tank and to another point outside the apparatus.

16 Claims, 5 Drawing Sheets

TANK CARRIER APPARATUS

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to carriers for tanks. More particularly, this invention pertains to an apparatus for carrying one or two tanks sized for personal use, most particularly oxygen tanks, although the apparatus could be used for tanks containing other gases or fluids.

For health reasons, many people must use oxygen. In order to enjoy a full life, it is necessary for those people to be able to make use of an oxygen tank of a size that is portable. However, even portable oxygen tanks are heavy, especially for people with health problems. Such tanks are cumbersome and can be difficult to carry when the oxygen user is also carrying other personal items, such as a purse or a sweater. Traditional oxygen carriers with shoulder straps, such as the one shown in U.S. Pat. No. 4,739,913, are too heavy for most people to carry. Oxygen tank carriers with wheels, such as the one shown in U.S. Pat. No. 2,667,397, are generally a metal frame on wheels, which are rigid and difficult to maneuver, not to mention aesthetically unpleasing.

What is needed, then, is a tank carrier apparatus which does not have to be carried by the oxygen tank user on his or her back or shoulders.

What is also needed is a tank carrier apparatus that is wheeled and is easy to maneuver.

What is also needed is a tank carrier apparatus that provides storage space for personal items.

Finally, what is also needed is a tank carrier apparatus that can securely hold for transport either one or two tanks.

BRIEF SUMMARY OF THE INVENTION

A tank carrier apparatus in accordance with the present invention includes a main compartment for holding one or two tanks, at least one handle, and at least one wheel. The main compartment includes an interior sleeve which is movable between two positions to allow for the secure holding of either one or two tanks. The main compartment is accessed by a closeable opening and provides a port through which an oxygen tube to be connected to a tank inside the main compartment.

Furthermore, the present invention includes a main compartment with a padded nylon sleeve with a unique concave design to accommodate one or two tanks, a front clipping system with a flip top entry for accessing the main compartment where the tank or tanks are housed, a port hole in the top of the carrier for the oxygen hose, a retractable padded pull handle, a stationary, quick grab handle for easy carrying, two wheels with traction and stability control, an identification window and several pockets with color coded tags for personal items.

It is therefore an object of the present invention to provide a tank carrier which is less cumbersome for oxygen users.

Another object of the present invention is to provide a tank carrier which provides oxygen users more independence and prolongs their lives.

Still another object of the present invention is to provide a means for transporting an oxygen tank without the oxygen user having to carry the weight of the tank or tanks.

A further object of the present invention is to provide a tank carrier apparatus that also provides space for carrying personal items.

A further object of the present invention is to provide a color-coded system to assist an oxygen user in finding personal items in the tank carrier apparatus.

A further object of the present invention is to provide a tank carrier apparatus that can securely hold and transport either one or two tanks.

Other and further objects, features and advantages of the present invention will be readily apparent to those skilled in the art upon the reading of the following disclosure when taken in conjunction with the accompanying drawings.

DETAILED DESCRIPTION OF THE INVENTION

Figure 1:
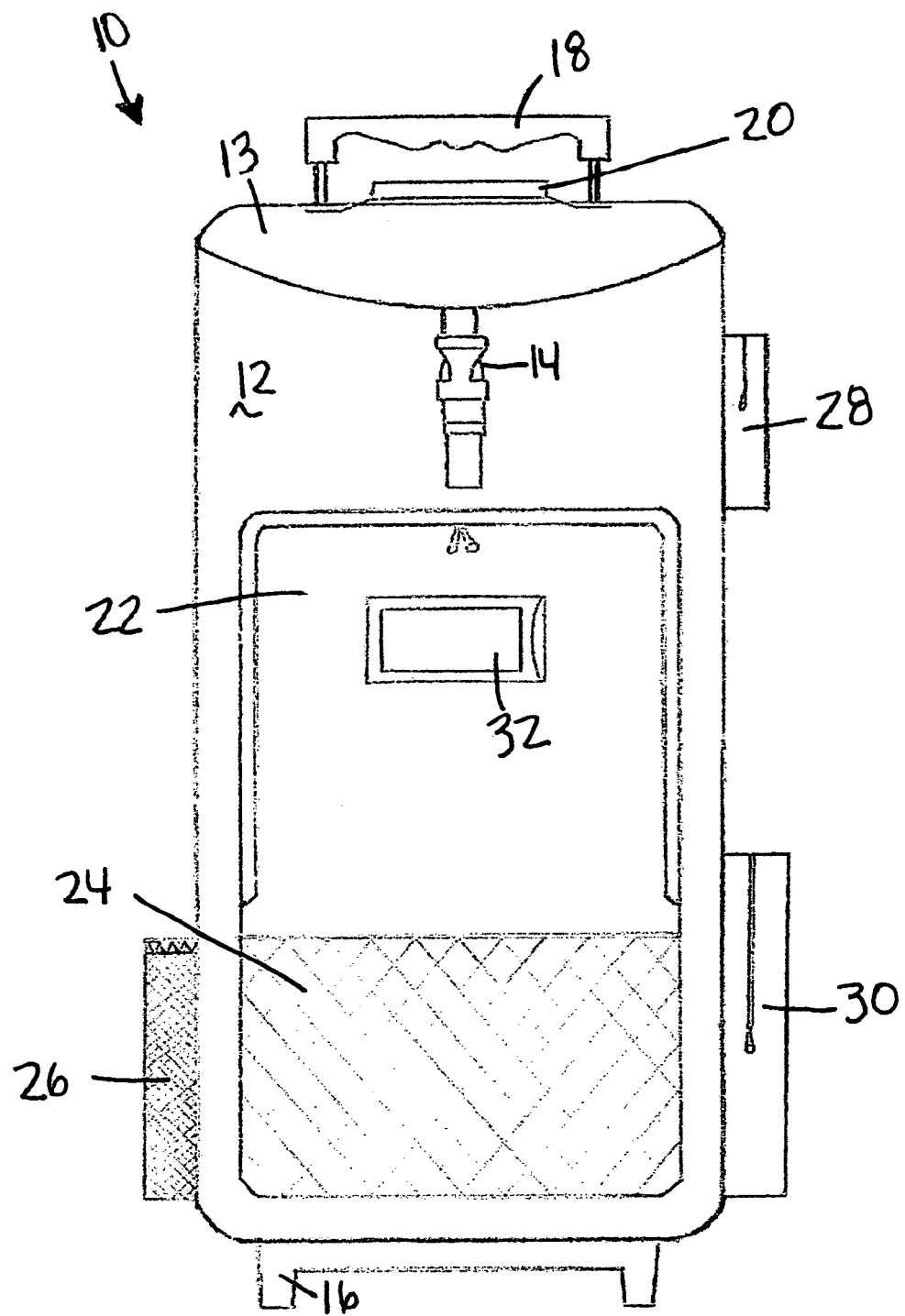
FIG. 1 is a front view of one embodiment of the tank carrier apparatus of the present invention.

Referring now to the drawings designated as FIGS. 1 through 10, the present invention relates to a tank carrier apparatus that enables easy and mobile transport of a tank or tanks. Throughout this description, the term "tank" refers to an oxygen tank; however, it is contemplated that the tank carrier apparatus of the present invention could be utilized for transporting any other appropriate type of tank.

Referring now to FIG. 1, a front view of the tank carrier apparatus of the present invention 10 is shown in a closed, stored, upright, static position. The apparatus 10 includes a main compartment 12, also referred to as compartment 12, which houses a tank or tanks in its interior. The interior of main compartment 12 is accessed through its lid 13 which opens to expose the interior of main compartment 12. Lid 13 is a removable or hinged cover allowing access to compartment 12. Lid 13 can be securely closed by latch 14. It is contemplated that latch 14 could take any form known in the art, for example a clipping system, snap, button, hook and loop closure, or zipper. Main compartment 12 rests on foot 16 and wheels 34 (shown in FIG. 2) when not in transport. In the preferred embodiment, the tank carrier apparatus has two handles, retractable pull handle 18 and stationary handle 20. Retractable pull handle 18 can be extended from main compartment 12 for pulling the apparatus when it is tilted so that it rests only on wheels 34. Stationary handle 20 can be used to lift the apparatus, i.e., up steps or into a vehicle, or to carry the apparatus.

On the exterior of main compartment 12 is front pocket 22. In the preferred embodiment of the invention, front pocket 22 opens to reveal an organizer with compartments to hold various personal items such as writing utensils and coins. The preferred embodiment of apparatus 12 contains several other pockets, including front mesh pocket 24, side mesh pocket 26, side pocket 28 which is sized to hold a mobile telephone and side pocket 30. The preferred embodiment of the invention also contains identification pocket 32. It is contemplated that the apparatus of the present invention could contain more or fewer pockets and that the arrangement of the pockets shown in the figures could be rearranged while remaining within the spirit of the present invention. It is also contemplated that the pockets could be of other sizes, materials and have a variety of types of closures, i.e., zippers, snaps, hook and loop, etc., without exceeding the scope of the invention. Furthermore, it is contemplated that the pockets could be color-coded to assist the user in identifying and remembering what each pocket holds. Alternatively, the pockets could be labeled with words or symbols to identify the item held by each pocket.

Figure 2:
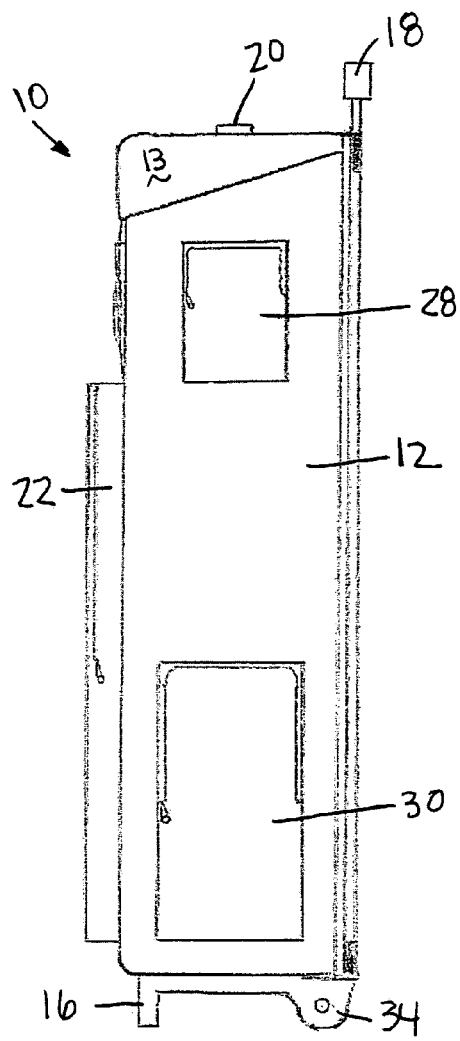
FIG. 2 is a side view of one embodiment of the tank carrier apparatus of the present invention.

FIG. 2 illustrates a side view of the present invention and shows the placement of wheel 34. In the preferred embodiment, it is contemplated that two wheels would be utilized, one on each corner of the bottom of the compartment on the same side at retractable handle 18. However, an alternative embodiment might utilize more or less wheels, for example a single wide wheel might be used that extends the length of the bottom edge of the compartment on the same side as retractable handle 18. Preferably, wheels 34 are rubber and provide traction and stability control, allowing easy maneuvering and handling over all surfaces.

Figure 3:
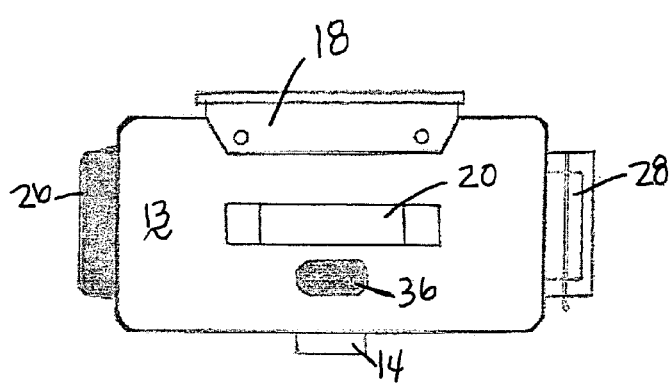
FIG. 3 is an overhead view of one embodiment of the tank carrier apparatus of the present invention.

FIG. 3 shows the top of main compartment 12, particularly lid 13 when in the closed position. FIG. 3 also illustrates port 36 which is an opening for the oxygen hose, allowing the oxygen user to connect the oxygen hose to a tank and thread the hose through the top of the main compartment 12 so that the oxygen may be used while the tank is in the main compartment 12 of the present invention and lid 13 is closed.

Figure 4:
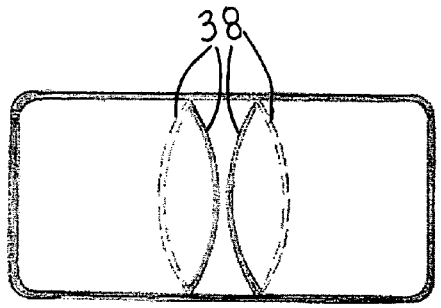
FIG. 4 is an overhead view of the inside of one embodiment of the tank carrier apparatus of the present invention without a tank inside the compartment.

Sleeve 38 is attached to the interior of main compartment 12. Preferably, sleeve 38 is constructed of a nylon padded material and is sewn into the main compartment 12. However, sleeve 38 could be constructed of other materials known in the art and could be attached to the main compartment in any way known in the art. Furthermore, it is contemplated that sleeve 38 could be configured to fit into main compartment 12 in a removable fashion, so as not to be permanently attached. Sleeve 38 has two partitions 38A, 38B and is configured such that each partition is movable between a concave and a convex position. FIG. 4 shows the sleeve 38 in broken lines with both partitions in a concave position and sleeve 38 in solid lines with both partitions in a convex position.

Figure 5:
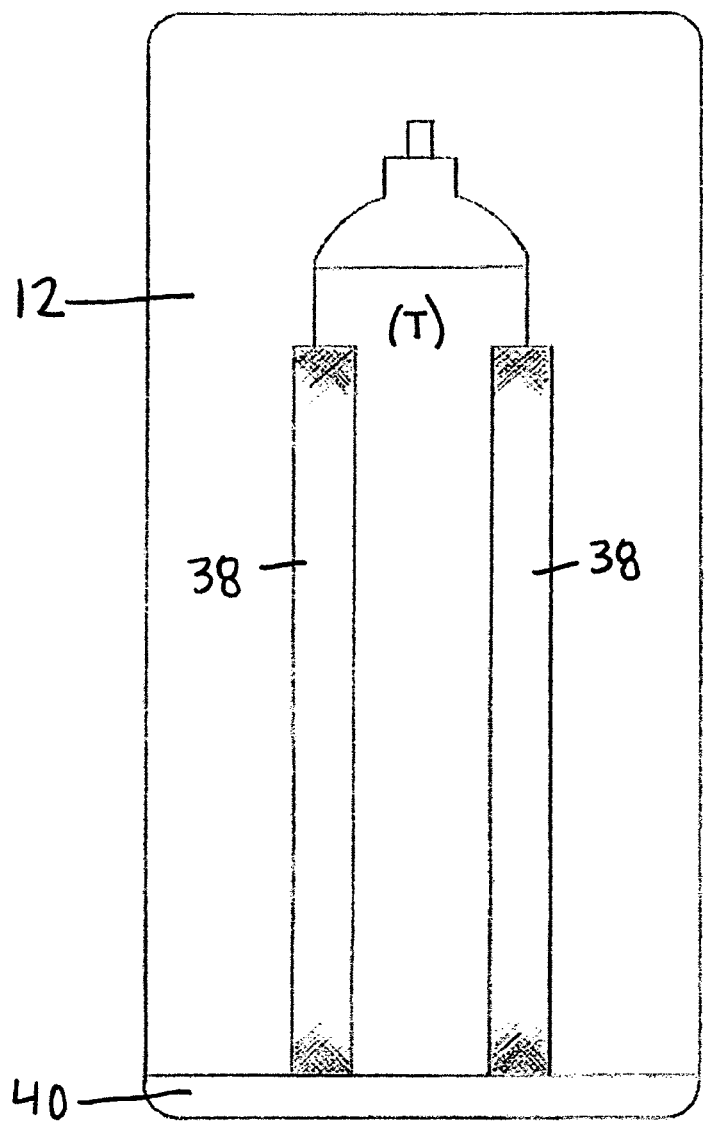
FIG. 5 is a front view of the inside of one embodiment of the tank carrier apparatus holding one tank.

FIG. 5 shows an interior view of main compartment 12 with one tank (T). The partitions of sleeve 38 are in the concave position, cradling the tank (T) and holding it in position within the main compartment 12. FIG. 5 also shows base 40 of main compartment 12. Base 40 supports a tank or tanks within main compartment 12 and in a preferred embodiment, base 40 is constructed of a lightweight plastic with foam rubber padding and covered by a nylon cover.

Figure 6:
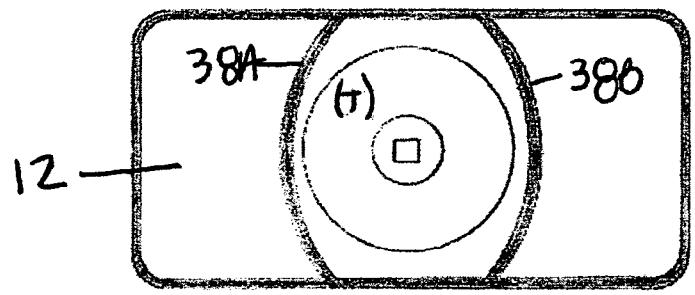
FIG. 6 is an overhead view of the inside of one embodiment of the tank carrier apparatus of the present invention holding one tank.

FIG. 6 is a top view of the interior of main compartment 12 with one tank (T). Partitions 38A and 38B of sleeve 38 are in the concave position, cradling tank (T) so that it is stationary within main compartment 12.

Figure 7:
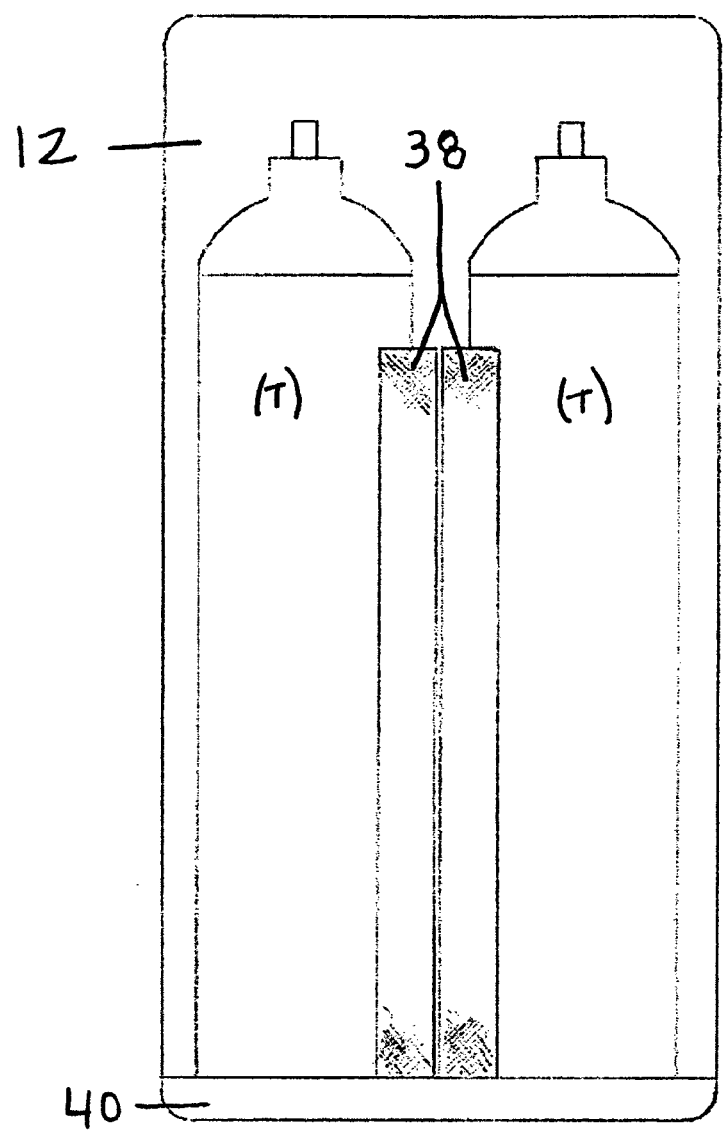
FIG. 7 is a front view of the inside of one embodiment of the tank carrier apparatus holding two tanks.

FIG. 7 is an interior view of main compartment 12 with two tanks (T) inside. The partitions of sleeve 38 are in the convex position, cradling the tank (T) and holding it in position within the main compartment 12. Sleeve 38 is between tanks (T) securing them in position and preventing them from contacting one another.

Figure 8:
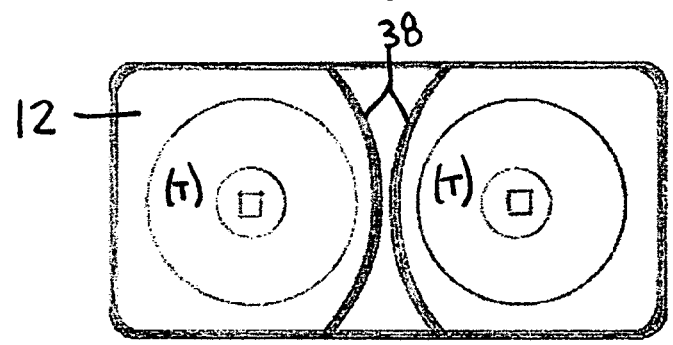
FIG. 8 is an overhead view of the inside of one embodiment of the tank carrier apparatus of the present invention holding two tanks.

FIG. 8 is a top view of the interior of main compartment 12 with two tanks (T) inside. Partitions 38A and 38B of sleeve 38 are in the convex position, cradling tanks (T) so that they do not contact one another and are stationary within main compartment 12.

Figure 9:
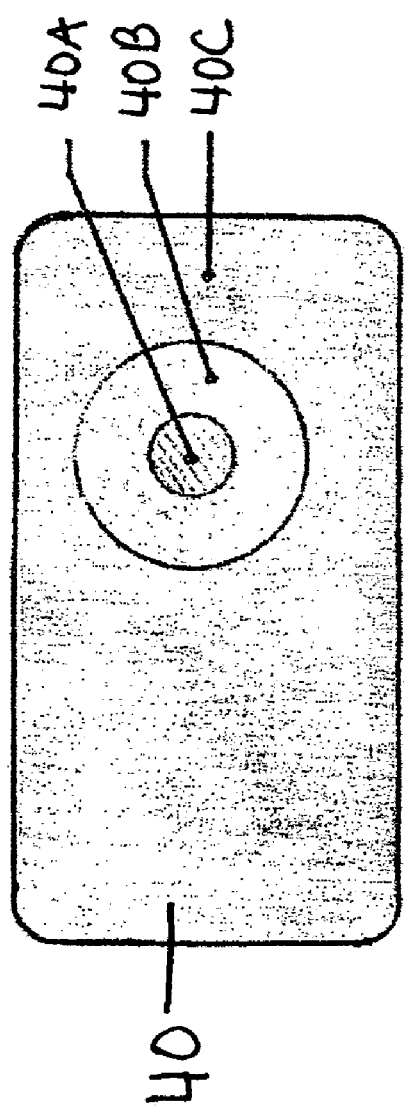
FIG. 9 is a cut-away detail of the base of the compartment of the present invention.
Figure 10:
FIG. 10 is a cross-sectional view of the base of the compartment of the present invention.

FIG. 9 is a cutaway detail of a preferred embodiment of base 40 showing the interior lightweight molded plastic 40A, the layer of foam rubber padding 40B and the nylon cover 40C. In the preferred embodiment, 40A is a ¾ inch lightweight molded plastic and 40B is a ¼ inch foam rubber padding. FIG. 10 is a side view of base 40. The base provides support for one or two tanks in the carrier.

Although it is contemplated that the tank carrier apparatus of the present invention could be of any size which is convenient to accommodate a tank or tanks, in the preferred embodiment the apparatus has dimensions of 24 inches by 12.5 inches by 6 inches providing a capacity to transport oxygen cylinder sizes M6, C and D.

Thus, although there have been described particular embodiments of the present invention of a new and useful Tank Carrier Apparatus, it is not intended that such references be construed as limitations upon the scope of this invention except as set forth in the following claims.

What is claimed is:

1. A tank carrier apparatus comprising:
   a compartment having an interior and an exterior;
   a sleeve attached to the interior of the compartment wherein the sleeve has two partitions, each partition movable between a concave and convex position, the sleeve being disposed to accommodate a tank when each partition is in the concave position and the sleeve being disposed to accommodate two separate tanks when each partition is in the convex position;
   at least one handle attached to the exterior of the compartment;
   an opening in the compartment disposed to accommodate the hose attached to the tank; and
   at least one wheel on the exterior of the compartment;
   wherein the tank is transported by moving the apparatus on the at least one wheel.

2. The apparatus of claim 1 further comprising:
   a pocket to contain identification information.

3. The apparatus of claim 1 further comprising:
   a pocket on the exterior of the compartment disposed to hold a mobile telephone.

4. The apparatus of claim 1 further comprising:
at least one pocket on the exterior of the compartment which is constructed of mesh.

5. The apparatus of claim 1 further comprising:
at least one pocket attached to the exterior of the compartment having dividers to hold items.

6. The apparatus of claim 1 wherein the compartment further comprises a closeable lid to provide access to the interior of the compartment.

7. The apparatus of claim 1 wherein the compartment further comprises a base disposed to support multiple tanks.

8. The apparatus of claim 1 wherein the at least one handle is stationary.

9. The apparatus of claim 1 wherein the at least one handle is retractable.

10. The apparatus of claim 1 wherein the at least one handle comprises:
a stationary handle; and
a retractable handle.

11. The apparatus of claim 1 wherein the at least one wheel is rubber.

12. The tank carrier apparatus of claim 1, wherein:
the partitions defining a tank enclosure so that a tank can be accommodated between the partitions when partitions are in the concave position; and
the partitions defining two tank enclosures so that a tank can be accommodated between one of the partitions and the interior of the compartment and so that another tank can be accommodated between the other partition and the interior of the compartment when the partitions are in the convex position.

13. The apparatus of claim 6 further comprising:
a latch to securely close the lid.

14. A tank carrier apparatus comprising:
a compartment having an interior and an exterior;
an access opening in the compartment providing access to the compartment interior;
a sleeve attached to the interior of the compartment for securing the tank, the sleeve defining two partitions, each partition movable between a concave and a convex position, the compartment being disposed to accommodate a tank when each partition is in the concave position and the compartment being disposed to accommodate two separate tanks when the sleeves are in the convex position;
at least one handle attached to the exterior of the compartment;
at least one pocket attached to the exterior of the compartment;
an opening in the compartment disposed to accommodate the hose attached to the tank;
at least one foot on the exterior of the compartment;
at least one wheel on the exterior of the compartment;
wherein the tank is transported by moving the apparatus on the at least one wheel and wherein the sleeve holds the tank being transported in place within the compartment.

15. The tank carrier of claim 14, further comprising:
the partitions defining a tank enclosure so that a tank can be accommodated between the partitions when partitions are in the concave position; and
the partitions defining two tank enclosures so that a tank can be accommodated between one of the partitions and the interior of the compartment and so that another tank can be accommodated between the other partition and the interior of the compartment when the partitions are in the convex position.

16. A tank carrier apparatus for transporting one or two tanks comprising:
a compartment having an interior and an exterior;
a lid in the compartment providing access to the compartment interior;
a sleeve attached to the interior of the compartment for securing the tank, the sleeve comprising two partitions movable between a concave position and a convex position;
a stationary handle attached to the exterior of the compartment;
a retractable handle attached to the exterior of the compartment;
a mesh pocket attached to the exterior of the compartment;
a pocket to accommodate a mobile telephone attached to the exterior of the compartment;
a pocket having an organizer panel attached to the exterior of the compartment;
an opening in the compartment disposed to accommodate the hose attached to the tank;
a foot on the exterior of the compartment;
at least one wheel on the exterior of the compartment;
wherein the tank is transported by moving the apparatus on the least one wheel and wherein the sleeve holds the tank being transported in place within the compartment.

* * * * *